INVENTOR
HENRY F. McKENNEY
BY Victor D. Borst
ATTORNEY

United States Patent Office 2,817,773

Patented Dec. 24, 1957

2,817,773

MAGNETIC PULSE GENERATOR

Henry F. McKenney, Weston, Mass., assignor to Sperry Rand Corporation, Ford Instrument Company Division, Long Island City, N. Y., a corporation of Delaware Application November 6, 1956, Serial No. 620,677

7 Claims. (Cl. 307—106)

This invention relates to magnetic pulse generators for producing uniformly repeating rectangular signals. More particularly, the invention is directed toward new and improved pulse generator circuits employing magnetic amplifiers and saturable reactors in applications requiring large power sources.

In the present state of the magnetic amplifier art, the application of pulse generators has been limited due to inefficiencies in power transfer and lack of regularity of the repeating wave form in the output, especially for pulses of short time duration.

In general, the invention contemplates a pair of saturable reactors biased to different states of magnetism, each of the reactors being in series with oppositely poled input windings of a pulse transformer. The series combinations are placed in parallel across a sinusoidal voltage source having a frequency equal to the repetition rate of the rectangular voltage pulses to be generated. The sinusoidal voltage saturates the reactors consecutively so that separate current pulses are produced in the parallel branches to induce differentially a rectangular voltage pulse in the transformer output.

An object of this invention is to provide a new and improved circuit means for generating repeating rectangular voltage pulses with large power capability.

Another object of this invention is to provide improved circuit means for generating rectangular voltage pulses which have improved waveform with short pulse time duration and repeat accurately in succeeding cycles.

Another object of this invention is to provide circuit means for obtaining efficient pulse generation with respect to power transfer.

Another object of the invention is to provide a small and light pulse generator which will satisfy specific power and voltage requirements.

The features of the invention will be understood more clearly from the following detailed description taken in conjunction with the accompanying drawings, in which.

Figure 4:
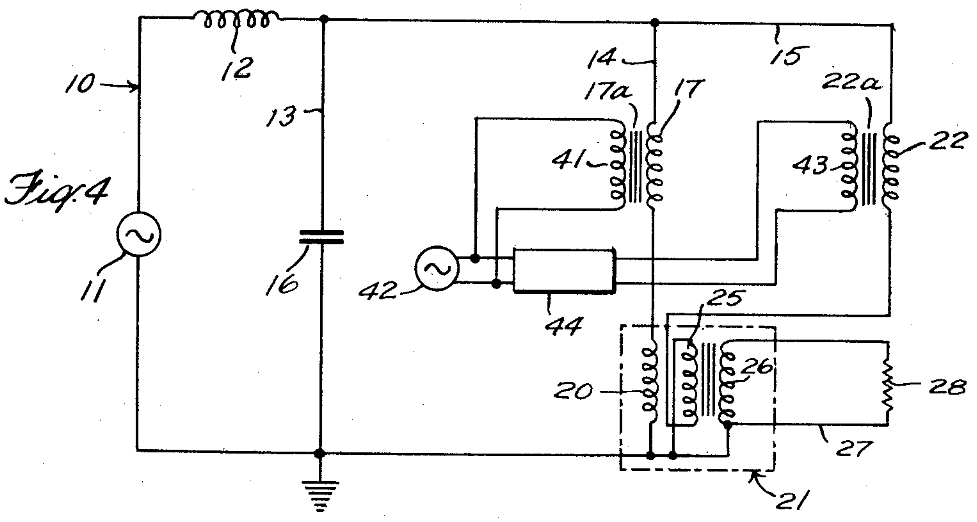
Figure 5:
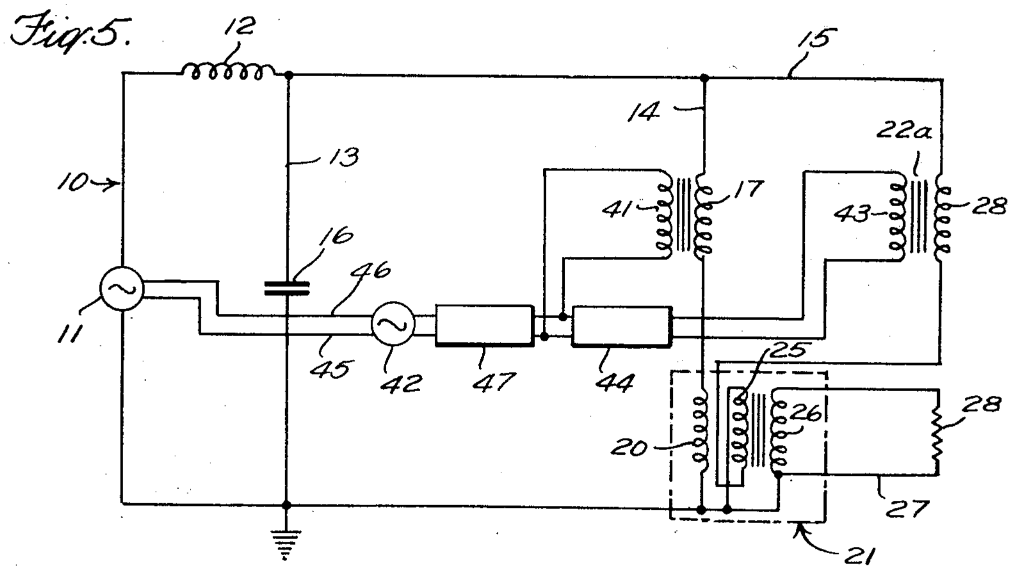

Fig. 4 is a modified schematic diagram of an embodiment of the invention illustrating a differential circuit for generating rectangular voltage pulses by employing saturable reactors and means for synchronizing the output from an auxiliary signal source; and Fig. 5 is a modified schematic diagram of a differential circuit incorporating means for establishing a controllable time reference and synchronization for the circuit output and the sinusoidal signal source.

Figure 1:
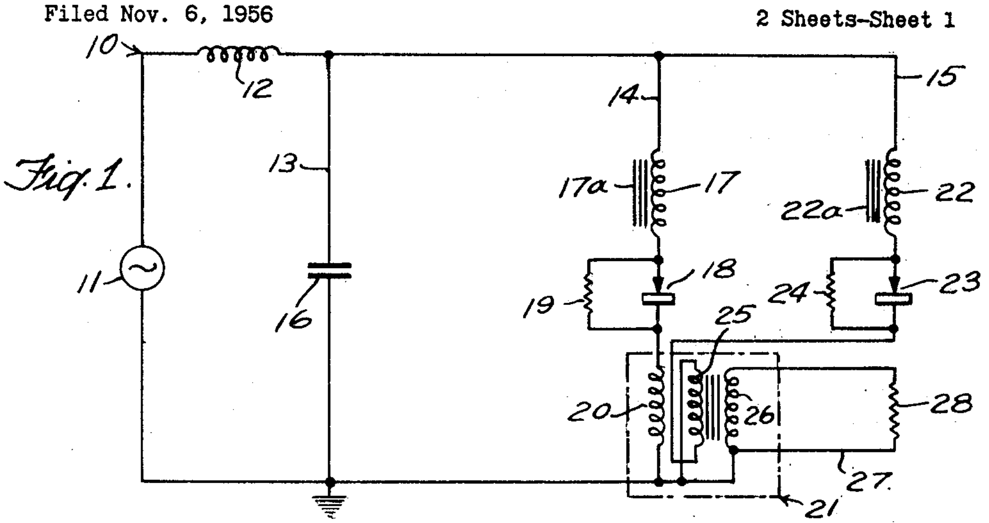
Fig. 1 is a schematic diagram of an embodiment of the invention illustrating differential circuit means employing magnetic amplifiers for generating a rectangular voltage pulse.

Referring to Fig. 1, the input circuit 10 comprises a sinusoidal signal generator 11 having a frequency equal to the desired repetition rate of the generated pulses in series with an inductor 12 and a parallel circuit having three branches 13, 14 and 15, one of the junction points of the three branches being connected to ground. In branch 13 there is provided a capacitor 16 which has a capacitance value sufficient to produce series resonance with the inductor 12 when the branches 14 and 15 have high impedance values. Branch 14 includes in series a reactor winding 17 disposed upon saturable core **17*a*, a half wave rectifier 18 poled in the direction of the ground connection and shunted by a biasing resistor 19, and an input winding 20 of pulse transformer 21. Branch 15 is also a series circuit having a reactor winding 22 disposed upon saturable core 22*a*, a half wave rectifier 23 poled similarly to the rectifier 18 and shunted by biasing resistor 24 and an input winding 25 of the pulse transformer 21. The input winding 25 is oppositely poled to winding 20 so as to produce opposing fluxes in the transformer 21. The output winding 26 of pulse transformer 21 is connected to an output circuit 27 which includes a load resistor 28**.

When the reactor cores **17*a* and 22*a* are not saturated, the impedance of branches 14 and 15 are high. Operating under the condition of series resonance for inductor 12 and capacitor 16, the voltage appearing across capacitor 16 is sinusoidal in shape but is of greater amplitude than the voltage of signal generator 11. As is explained later, biasing resistors 19 and 24 will have voltage differences across their respective terminals when the voltage across capacitor 16 is zero and is about to rise to a positive value relative to ground potential. Furthermore the voltage across the biasing resistors 19 and 24 are designed to have different values as influenced by the respective resistances in branches 14 and 15 and these voltages will bias the state of magnetization in reactor cores 17*a* and 22*a* to different values. Hence when the increasing voltage appearing across capacitor 16 is applied simultaneously to both branch circuits 14 and 15, one of the reactor cores 17*a* or 22*a* will reach a state of saturation prior to the other. Assuming that reactor core 17*a* has the higher biased state of saturation, branch 14 will be the first to conduct a large current pulse by virtue of its lowered impedance at saturation. This current pulse flows through the reactor winding 17, the poled half wave rectifier 18 and the pulse transformer input winding 20. Similarly a second large pulse of current flows through the other branch 15 including the input winding 25 when the voltage of the capacitor 16 is applied for the necessary period of time required to saturate the reactor core 22*a***.

Figure 2:
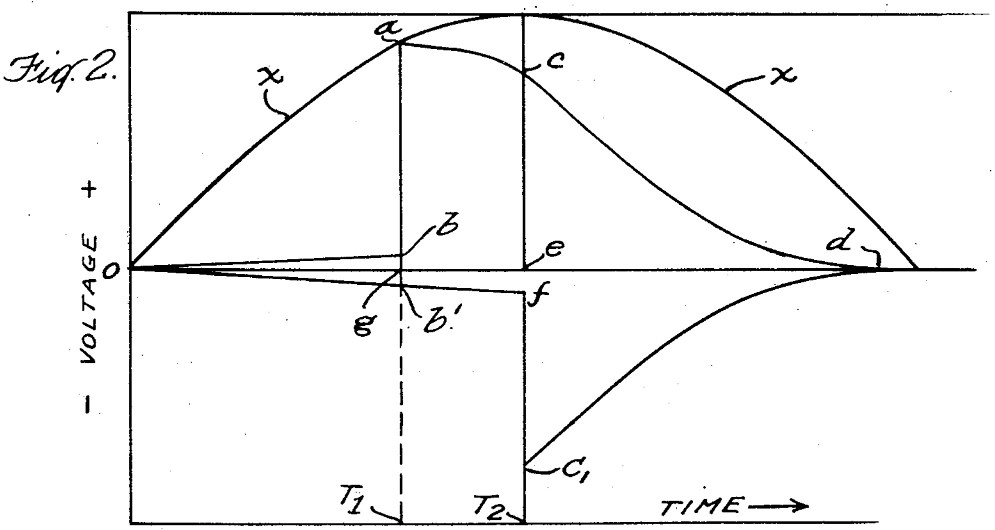
Fig. 2 is a diagrammatic representation of the voltage input to the two separate input windings of a pulse transformer in the differential circuit.

Fig. 2 illustrates diagrammatically the variations with time of the voltage inputs to windings 20 and 25 of the pulse transformer 21 as brought about by the current pulses in branches 14 and 15. As shown in Fig. 2, prior to time instant $t_1$, both reactor cores **17*a* and 22*a* are unsaturated and the voltage shown appearing across the reactor windings 17 and 22** varies from zero to *a*. The net voltage on the windings 20 and 25, shown by lines *ob* and $ob_1$ in the diagram, is nearly zero. At time instant $t_1$, the reactor core **17*a* becomes saturated, the impedance of reactor winding 17 abruptly drops to a low value and all of the voltage of capacitor 16** at that time, which is illustrated in Fig. 2 as point *a*, is applied to winding 20. Since the capacitor 16 will start to discharge when current flows in branch 14, the voltage across this capacitor will decay as represented by line *ac*. At time instant $t_2$, the reactor core **22*a* becomes saturated and its impedance abruptly drops to a low value. Substantially all of the voltage of capacitor 16 at that time is applied to winding 25 as well as to winding 20. However, since winding 25** is wound oppositely to winding 20, the voltage variation is along line *cd* for winding 20, and $c_1$ to *d* for winding 25. The energy drain of branches 14 and 15 on capacitor 16 causes its voltage variation to deviate from its normal sinusoidal curve *x* to that of curve *acd* as shown. The voltage input to winding 20 of transformer 21 is represented by the curve *obacd* while the voltage input to winding 25 is represented by curve $ofc_1d$. The resultant voltage input to transformer 21 is represented by the curve *gace* and this voltage pulse is induced in the output winding 26. By proper design and choice of circuit element values, the pulse generated in output circuit 27 will be rectangular in shape and of pulse width equal to $t_2$ minus $t_1$. The slope of the leading edge of the generated rectangular pulse in the output circuit 27 is steep, especially when the values of the circuit elements are chosen so as to produce a greater amplitude of voltage across capacitor 16 than that of signal generator 11. The trailing edge of the pulse will be steep as effected by the 180° phase cancellation of two similar condenser discharge voltage variations.

The bias voltages across resistors 19 and 24 are generated during the negative voltage cycle appearing across capacitor 16 when half wave rectifiers 18 and 23 prevent a reverse power pulse of current in branches 14 and 15. However the bias resistors 19 and 24 provide a shunt path for a small reverse current and by proper choice of circuit values, the IR drop across resistors 19 and 24 will bias the state of partial magnetization in saturable cores 17*a* and 22*a* to different values for circuit operation as explained above.

Figure 3:
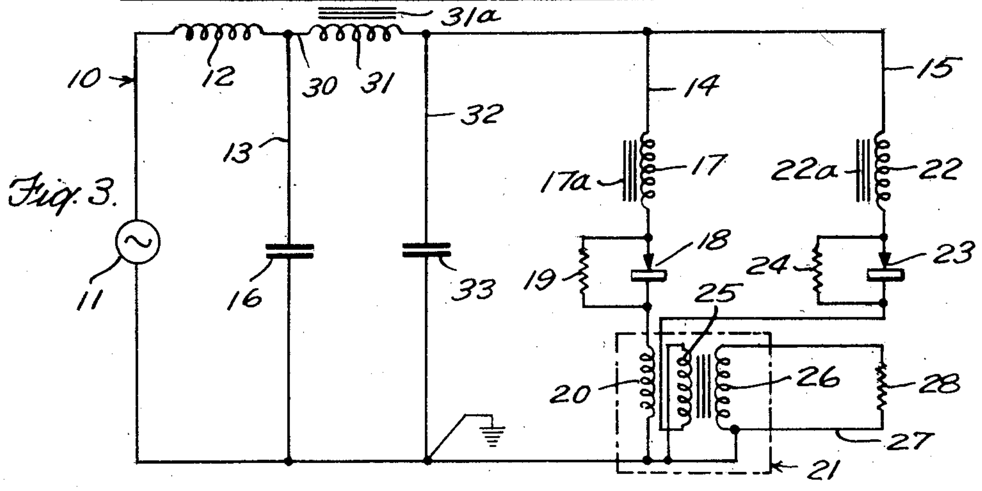
Fig. 3 is a modified schematic diagram of a differential circuit incorporating a cascading saturable reactor stage for generating rectangular voltage pulses.

Fig. 3 incorporates a cascade input network with the differential circuit of Fig. 1 so as to effect a steeper leading edge for the rectangular voltage pulses generated in output circuit 27. In order to simplify the understanding of the embodiments of the invention, like reference numbers will be used to identify corresponding elements in all figures. In Fig. 3, the input circuit 10 has two parallel branches 13 and 30. Branch 30 is a series circuit including reactor winding 31 disposed upon saturable core 31*a* and three parallel branches 32, 14 and 15. Branch 32 has a capacitor 33 while branches 14, 15 and 16, as well as the remainder of the circuitry, are similar to those shown in Fig. 1. The voltage applied to branches 14 and 15 will have a steeper wave front than the voltage applied to the same branches in the device shown in Fig. 1 because this voltage remains at a low value until the voltage across condenser 16 reaches a value with time sufficient to saturate reactor core 31*a*. At this point, the voltage across capacitor 33 suddenly jumps to practically that of capacitor 16 as the impedance of reactor winding 31 suddenly drops. This transient voltage variation across capacitor 33 is steeper than the sinusoidal growth of voltage across capacitor 16 and for that reason, its application simultaneously to branches 14 and 15 will effect a steeper leading edge in the voltage pulse generated in the output circuit 27.

In Fig. 4, the voltage pulse in the output circuit 27 is phase displaced and synchronized with the input signal of an auxiliary pulse generator or signal circuit. The wave form and repetition timing of the rectangular voltage pulse in the output circuit 27 are thereby generally improved. It will be noted that the reactor branches 14 and 15 are unrectified and unbiased. A control winding 41 disposed on the saturable core 17*a* is connected to an auxiliary signal generator 42. Another control winding 43 disposed on the saturable core 22*a* is poled similarly to control winding 41 and this winding is connected through a delay network 44 to auxiliary pulse generator 42, its voltage being applied so as to saturate cores 17*a* and 22*a* when the voltage across the condenser 16 is positive. The voltage pulses from generator 42 saturates reactor cores 17*a* and 22*a* at different points of time and the current pulses abruptly starting and flowing through input windings 20 and 25 will generate a rectangular pulse in the output circuit 27 as previously explained. The pulse width of this voltage is equal to the amount of delay introduced by the delay network 44. By the use of control windings 41 and 43, signal generator 42 and delay network 44, the bias resistors and rectifiers are eliminated and the need for the critical adjustments thereof are obviated.

In Fig. 5, the auxiliary pulse generator is synchronized with the sinusoidal input voltage. Two delay circuits are introduced to consecutively phase the saturation of the cores in the reactor branches with relationship to the sinusoidal input voltage. Auxiliary pulse generator 42 is synchronized with sinusoidal generator 11 by conductors 45 and 46. The output of pulse generator 42 is connected to delay network 47 and the output of network 47 is connected to control winding 41 in parallel connection with the input of delay network 44. As in the device of Fig. 4, delay network 44 controls the pulse width of the rectangular voltage pulse in the output circuit 27. Delay network 47 is adjusted to properly phase the voltage applied to control winding 41 with reference to the voltage appearing across condenser 16, the latter voltage having a selected phase relation to the sinusoidal voltage of generator 11.

It is to be understood that various modifications of the invention other than those above described may be effected by persons skilled in the art without departing from the principle and scope of the invention as defined in the appended claims.

What is claimed is:

1. A rectangular pulse generator comprising a source of alternating voltage, a pair of branch circuits connected across said voltage source, a pair of saturable cores, each of said circuits having a reactor winding disposed on one of said cores, a flux control means for consecutively saturating said saturable cores and a transformer having a pair of input windings and an output winding, each of said input windings being disposed in one of said circuits and poled to induce opposing fluxes in said transformer.

2. A rectangular pulse generator as claimed in claim 1 wherein said flux control means for consecutively saturating said saturable cores is a pair of unidirectional conductive devices and a pair of biasing resistors, each of said biasing resistors being in shunting connection with one of said unidirectional conductive devices and disposed in each of said branch circuits, said unidirectional conductive devices being poled in similar directions.

3. A rectangular pulse generator as claimed in claim 2 wherein the said source of alternating voltage comprises a capacitor, an inductor connected in series relationship with said capacitor and a sinusoidal voltage generator, said capacitor and said inductor being connected across said voltage generator in series resonance relationship thereto and said pair of branch circuits is connected across said capacitor.

4. A rectangular pulse generator as claimed in claim 3 wherein there is provided a third branch circuit having a second capacitor and a third reactor winding disposed upon a third saturable core and connected between said first capacitor and said second capacitor.

5. A rectangular pulse generator as claimed in claim 1 wherein the flux control means for consecutively saturating said saturable cores is a pair of control windings, each of said control windings being similarly poled and disposed on one of said saturable cores, a delay network connected between said control windings and an auxiliary pulse generator connected to input side of said delay network.

6. A rectangular pulse generator as claimed in claim 5 wherein the said source of alternating voltage comprises a capacitor, an inductor connected in series relationship with said capacitor and a sinusoidal voltage generator, said capacitor and said inductor being connected across said voltage generator in series resonance relationship thereto and said pair of branch circuits is connected across the said capacitor.

7. A rectangular pulse generator as claimed in claim 6 wherein there is provided a second delay network, the output side of said second delay network being connected to the input side of said first delay network and the input side of said second delay network being connected to said auxiliary pulse generator, said auxiliary pulse generator is synchronized and connected to said voltage generator for receiving a portion of the output of said voltage generator.

No references cited.